(12) United States Patent
Kulas

(10) Patent No.: US 10,187,688 B2
(45) Date of Patent: *Jan. 22, 2019

(54) MOVING VIDEO TAGS

(71) Applicant: Gula Consulting Limited Liability Company, Dover, DE (US)

(72) Inventor: Charles J. Kulas, San Francisco, CA (US)

(73) Assignee: Gula Consulting Limited Liability Company, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,095

(22) Filed: Feb. 27, 2018

(65) Prior Publication Data

US 2018/0192120 A1 Jul. 5, 2018

Related U.S. Application Data

(63) Continuation of application No. 15/269,701, filed on Sep. 19, 2016, now Pat. No. 9,906,829, which is a (Continued)

(51) Int. Cl.
| | |
|---|---|
| *H04N 21/431* | (2011.01) |
| *H04N 21/462* | (2011.01) |
| *H04N 21/4722* | (2011.01) |
| *H04N 21/4782* | (2011.01) |
| *H04N 5/445* | (2011.01) |
| *H04N 21/4402* | (2011.01) |
| *H04N 7/01* | (2006.01) |

(52) U.S. Cl.
CPC ..... *H04N 21/4316* (2013.01); *H04N 5/44543* (2013.01); *H04N 21/4312* (2013.01); *H04N 21/4314* (2013.01); *H04N 21/440272* (2013.01); *H04N 21/4622* (2013.01); *H04N 21/4722* (2013.01); *H04N 21/4782* (2013.01); *H04N 7/0122* (2013.01)

(58) Field of Classification Search
CPC ............ G06F 17/3082; H04N 21/4312; H04N 21/4314; H04N 21/440272; H04N 21/4622; H04N 21/4722; H04N 21/4782; H04N 21/4316; H04N 21/4725; G06T 13/00; G06T 13/40; G05B 19/42
See application file for complete search history.

(56) References Cited

U.S. PATENT DOCUMENTS 5,680,532 A * 10/1997 Amakawa ............... G06T 13/00
345/473
5,929,849 A 7/1999 Kikinis
(Continued)

*Primary Examiner* — Hai V Tran

(57) ABSTRACT

A display device simultaneously displays at least the following: a video depicting an item in a scene; a tag in a first position overlaid on the video, the tag being associated with the item depicted in the video, wherein the tag includes descriptive text information describing the item depicted in the video; and a visually perceptible indicator extending between a proximity where the item is depicted in the video and a proximity of the first position. The tag undergoes continuous motion relative to at least a portion of the video scene from the first position to a second position different from the first position, while the display device displays the video and the tag overlaid on the video while the tag undergoes continuous motion.

20 Claims, 5 Drawing Sheets

Related U.S. Application Data continuation of application No. 12/172,185, filed on Jul. 11, 2008, now Pat. No. 9,451,195.

(60) Provisional application No. 60/949,505, filed on Jul. 12, 2007.

(56) References Cited

U.S. PATENT DOCUMENTS

| | | | |
|---|---|---|---|
| 5,987,509 | A | 11/1999 | Portuesi |
| 6,546,405 | B2 | 4/2003 | Gupta et al. |
| 6,580,870 | B1 | 6/2003 | Kanazawa et al. |
| 7,027,101 | B1 | 4/2006 | Sloo et al. |
| 7,133,837 | B1 | 11/2006 | Barnes |
| 7,224,401 | B2 | 5/2007 | Ackley et al. |
| 7,343,561 | B1 * | 3/2008 | Stochosky ............ G06Q 10/10 715/715 |
| 7,487,112 | B2 | 2/2009 | Barnes, Jr. |
| 8,073,830 | B2 | 12/2011 | Fontes et al. |
| 8,285,121 | B2 | 10/2012 | Kulas |
| 8,412,021 | B2 | 4/2013 | Kulas |
| 8,640,030 | B2 | 1/2014 | Kulas |
| 8,656,282 | B2 | 2/2014 | Kulas |
| 9,008,491 | B2 | 4/2015 | Kulas |
| 9,451,195 | B2 | 9/2016 | Kulas |
| 9,609,260 | B2 | 3/2017 | Kulas |
| 9,648,296 | B2 | 5/2017 | Kulas |
| 10,003,781 | B2 | 6/2018 | Kulas |
| 2004/0098754 | A1 | 5/2004 | Vella et al. |
| 2004/0107439 | A1 | 6/2004 | Hassell et al. |
| 2004/0143789 | A1 | 7/2004 | Chung et al. |
| 2004/0189868 | A1 | 9/2004 | Molaro et al. |
| 2005/0086690 | A1 * | 4/2005 | Gilfix .................. H04N 5/445 725/42 |
| 2005/0234958 | A1 | 10/2005 | Sipusic et al. |
| 2005/0262542 | A1 | 11/2005 | Deweese et al. |
| 2008/0031590 | A1 | 2/2008 | Kulas |
| 2008/0034295 | A1 | 2/2008 | Kulas |
| 2008/0184121 | A1 | 7/2008 | Kulas |
| 2009/0024927 | A1 | 1/2009 | Schrock et al. |
| 2009/0210778 | A1 | 8/2009 | Kulas et al. |
| 2017/0243618 | A1 | 8/2017 | Kulas |
| 2018/0192120 | A1 | 7/2018 | Kulas |

* cited by examiner

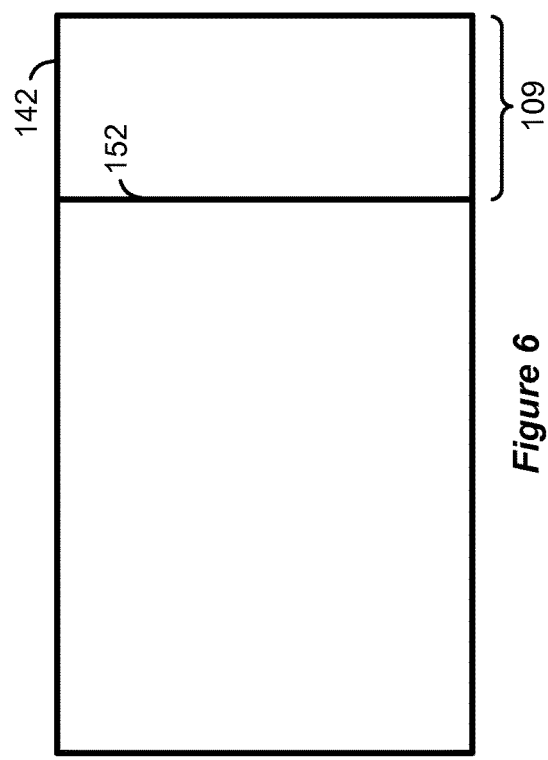
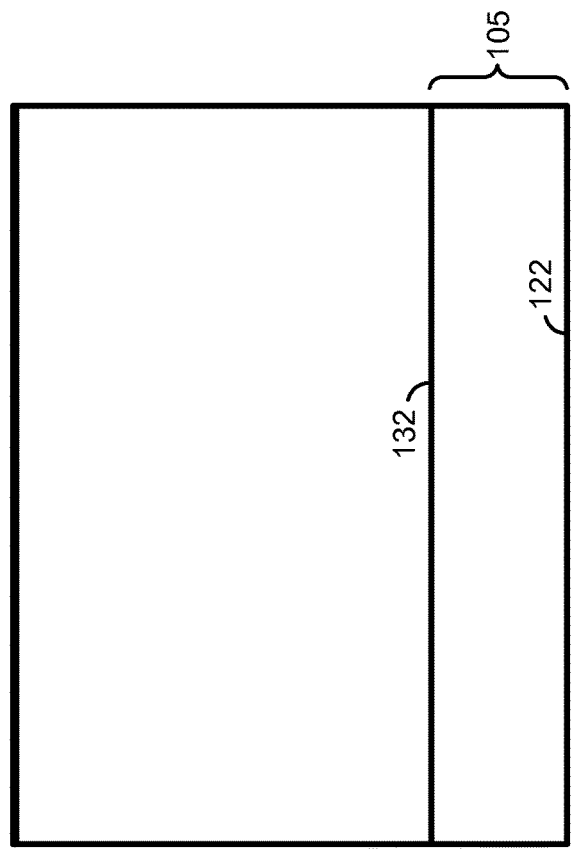

MOVING VIDEO TAGS

RELATED APPLICATIONS

This application is a continuation of U.S. patent application Ser. No. 15/269,701, flied on Sep. 19, 2016, entitled "MOVING VIDEO TAGS," now U.S. Pat. No. 9,906,829, which is a continuation of U.S. patent application Ser. No. 12/172,185, filed on Jul. 11, 2008, entitled "MOVING VIDEO TAGS OUTSIDE OF A VIDEO AREA TO CREAT A MENU SYSTEM," now U.S. Pat. No. 9,451,195, issued on Sep. 20, 2016, which claims priority from U.S. Provisional Patent Application No. 60/949,505, filed on Jul. 12, 2007, entitled "VIDEO TAGS OUTSIDE OF VIDEO AREA." The entire disclosures of all of the foregoing patent applications are hereby incorporated by reference herein.

This application is related to U.S. patent application Ser. No. 11/499,315, filed on Aug. 4, 2006, entitled "DISPLAYING TAGS ASSOCIATED WITH ITEMS IN A VIDEO PLAYBACK," the entire disclosure of which is hereby incorporated by reference herein.

This application is also related to U.S. patent application Ser. No. 11/669,901 filed on Jan. 31, 2007 entitled "AUTHORING TOOL FOR PROVIDING TAGS ASSOCIATED WITH ITEMS IN A VIDEO PLAYBACK," now U.S. Pat. No. 8,656,282, issued on Feb. 18, 2014, the entire disclosure of which is hereby incorporated by reference herein

SUMMARY OF EMBODIMENTS OF THE INVENTION

Tags in a video area are established by displaying the tags with a visual association to an item in the video. Thereafter, the tags move to a tag menu area that is outside of the video area. Tags are selectable, such as by clicking on the tag, to cause additional actions such as displaying a web page related to the tag. Tags move and disappear/appear in conjunction with the video as the video action progresses. In one embodiment, the tag menu area is obtained when a video with a first aspect ratio is displayed in a display area that has a different aspect ratio. The difference in aspect ratios leaves a portion in the display area that is not used for the video that can be used for the tag menu area.

BRIEF DESCRIPTION OF THE DRAWINGS

FIG. 5 shows high definition format video displayed within a standard definition area;

FIG. 6 shows a standard definition format video displayed within a high-definition format video;

DETAILED DESCRIPTION OF EMBODIMENTS OF THE INVENTION

Figure 1:
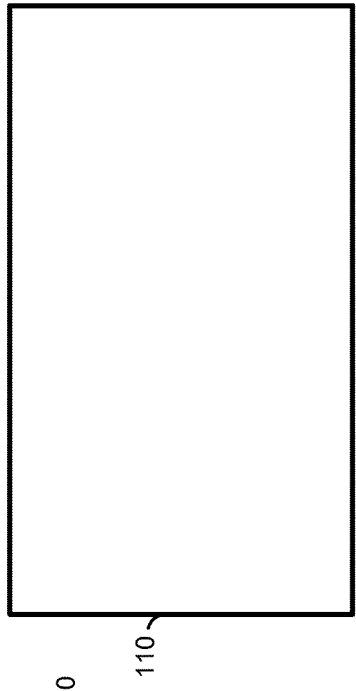
FIG. 1 is a first illustration of a prior art approach to displaying video.
Figure 2:
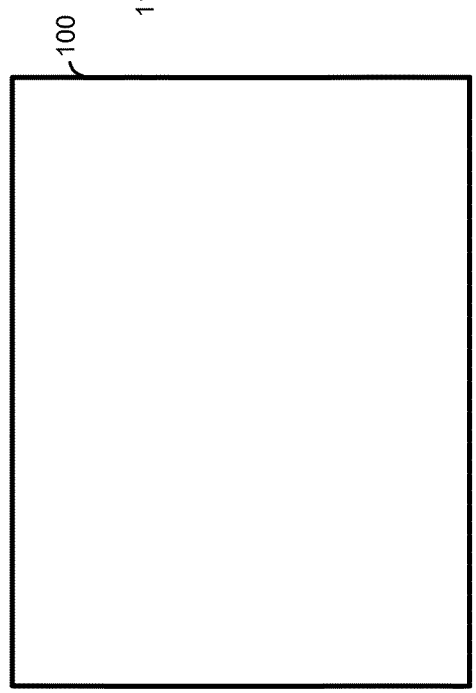
FIG. 2 is a second illustration of a prior art approach to displaying video.

FIGS. 1-4 illustrate prior art approaches to placing a video of a first aspect ratio into a display area of a second aspect ratio. In FIG. 1, video area 100 is a 4:3 aspect ratio such as is commonly used in standard definition (SD) video playback. The ratio 4:3 corresponds to the width divided by the height of the video area. FIG. 2 shows video area 110 which is representative of a 16:9 aspect ratio that is commonly used in high-definition (HD) video formats. Typically, the SD and HD formats are best displayed in a display area that matches the native dimensions of the video aspect ratio. In such cases the full display area (e.g., a television or display screen, predetermined area such as on a web page or computer program, etc.) is filled completely with the video area.

Figure 3:
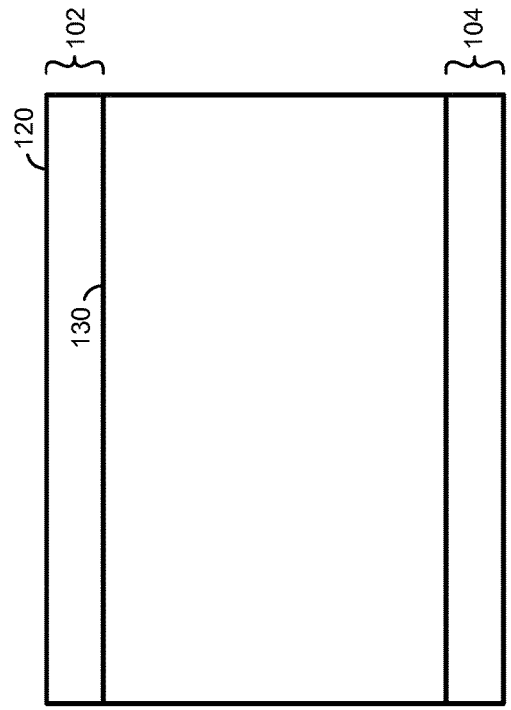
FIG. 3 is a third illustration of a prior art approach to displaying video.

However, in many cases it is undesirable or impossible to change the video display area to exactly match the video aspect ratio. For example, a user may have an SD television and may wish to view an HD program. In such a case, FIG. 3 illustrates a "letterbox" type of solution to the problem. In FIG. 3, an HD display area 120 accommodates HD video program 130 by scaling and vertically centering the HD video area so that it is centered within the SD screen area. This leaves blank or unused areas 102 and 104 at the top and bottom, respectively, of display area 120. These blank areas are typically black or grey and are not used to display video or any other information.

Figure 4:
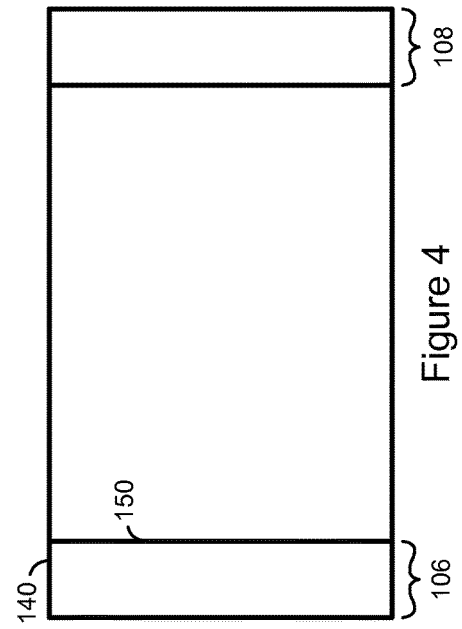
FIG. 4 is a fourth illustration of a prior art approach to displaying video.

Similarly, FIG. 4 illustrates an example where SD video program 150 is displayed within HD display area 140. This leaves blank "pillars" 106 and 108 on the left and right sides, respectively, of the display area.

FIG. 5 shows an approach according to an embodiment of the present invention where HD format video program 132 is displayed within SD display area 122 so that a lower blank area 105 is maximized. This blank area is advantageously used for display of enhanced or auxiliary information associated with the video program. For example, tags can be displayed in the video and in the blank area as described, below. Similarly, FIG. 6 shows an SD format video 152 displayed within HD area 142 so that a blank area 109 is maximized to the right of the video. This blank area can similarly be used for additional information related to the video or for other purposes. Naturally, the blank areas can be positioned at the top and/or left sides of FIGS. 5 and 6, respectively. The display area can be on a physical display screen, on a portion of a computer display or web page, or the display area can be defined by other means.

Figure 7:
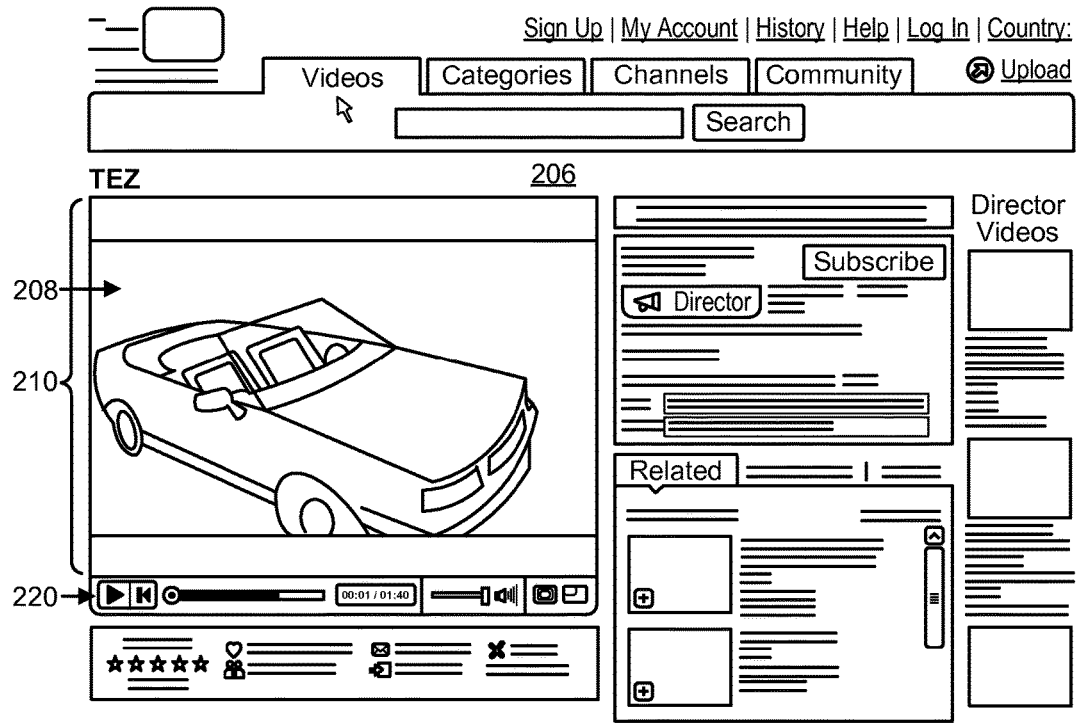
FIG. 7 shows a prior art approach where standard definition video is shown in a standard definition display area.

FIGS. 7-12 illustrate an HD format video displayed within an SD display area on a web page. FIG. 7 shows a prior art approach where SD video 208 is shown in SD display area 210 of web page 206. The web page provides video transport controls at 220 for performing standard control over the video playback such as start, stop, pause, skip to start, move to position, and volume control. Although specific controls are shown, in general any type and design of video playback controls can be provided.

Figure 8:
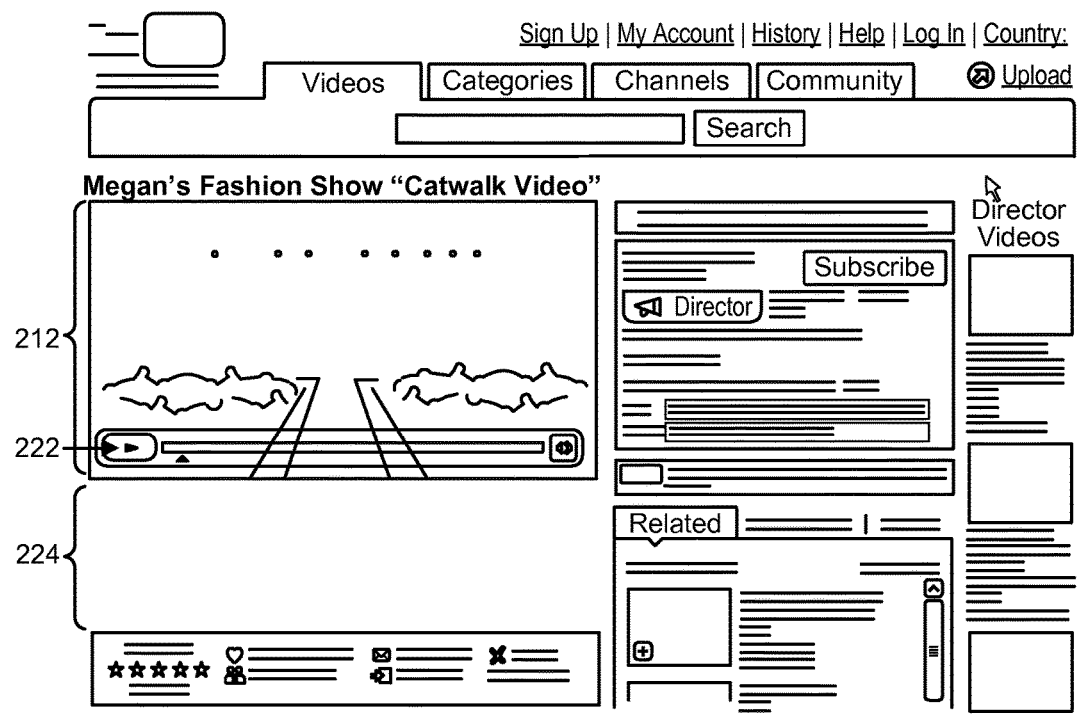
FIG. 8 shows high-definition video in a standard-definition area.

FIG. 8 shows HD format video 212 fit into the upper portion of the SD space on the same web page. This creates blank space 224 which will be used for tag menu items as described below. Transport controls 222 are overlayed onto the video area. However, other embodiments need not overlay the transport controls but may place them in any desirable position, such as in the position of FIG. 7, to the top, left or right sides, not display them at all, etc.

Figure 9:
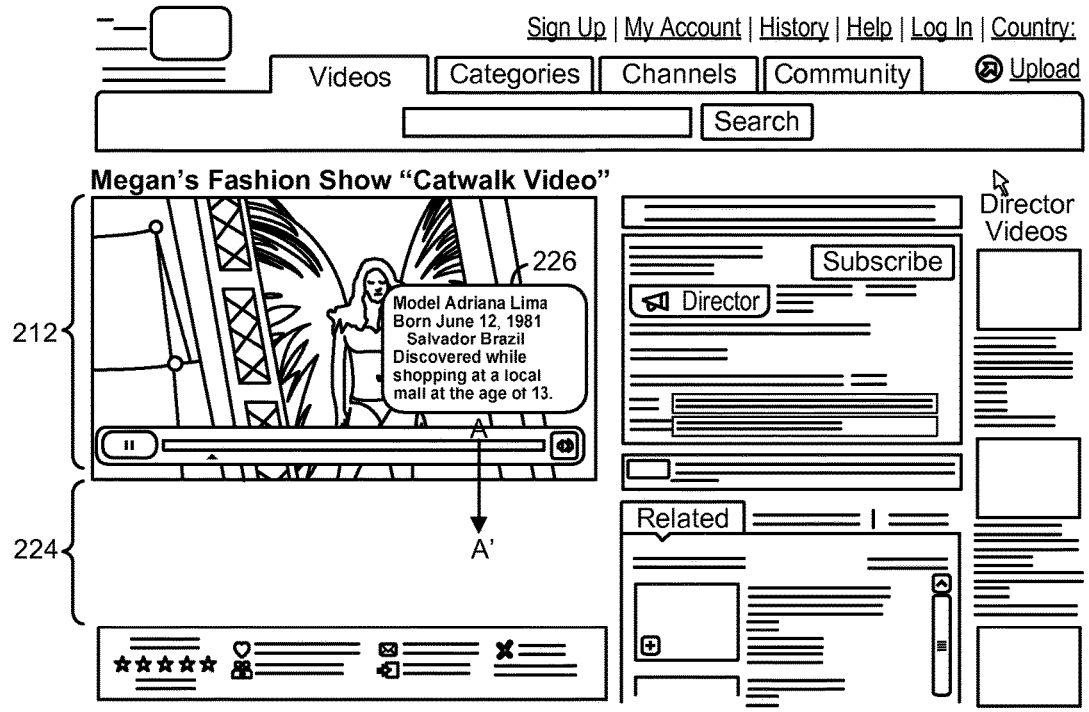
FIG. 9 illustrates video including a tag.

FIG. 9 illustrates video area 212 after the video has started playing back. A video bubble or tag 226 is shown that provides information about the model in the scene. Although specific video subject matter and tag text is shown it should be apparent that the video contents and tag text, design and other tag characteristics can be changed, as desired. As the video plays, the tag moves in the direction A to A' to reside in tag menu area 224.

Figure 10:
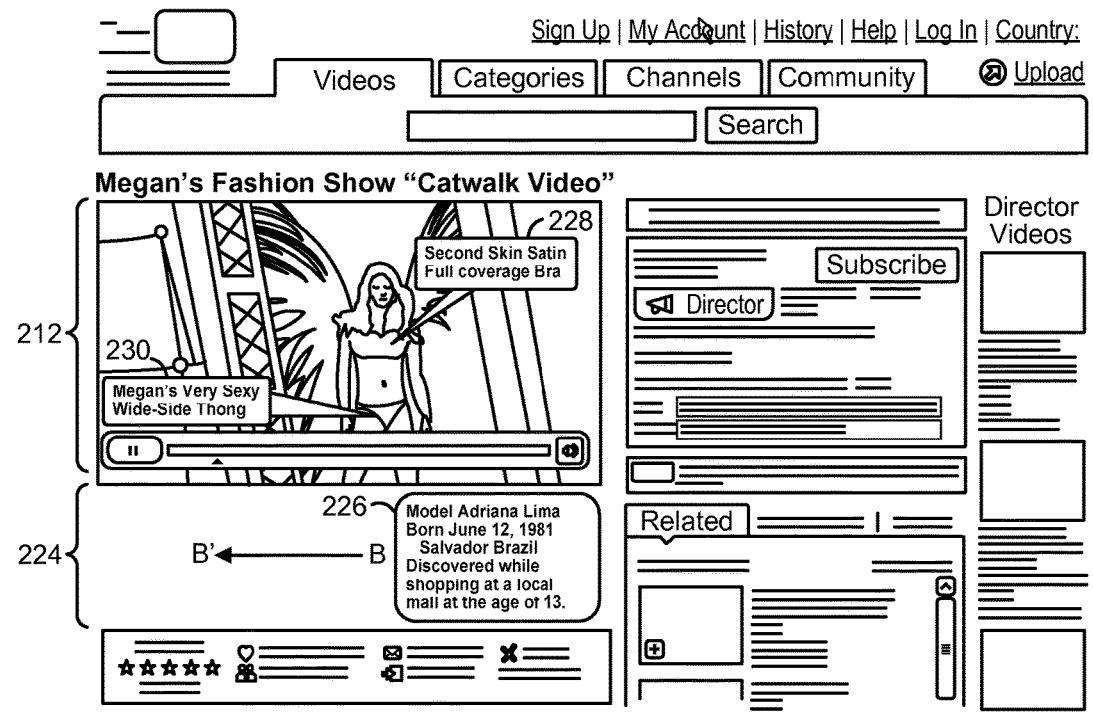
FIG. 10 shows a video after tag movement.

FIG. 10 shows the video display a few seconds later when tag 226 has moved into the tag menu area 224. Additional tags 228 and 230 have appeared in video area 212 to describe garments that the model is wearing. Visual pointers from tags 228 and 230 serve to associate each tag with its respective garment item. Tag 226 will next move along the direction B to B' while tags 228 and 230 will each move to the tag menu area.

Figure 11:
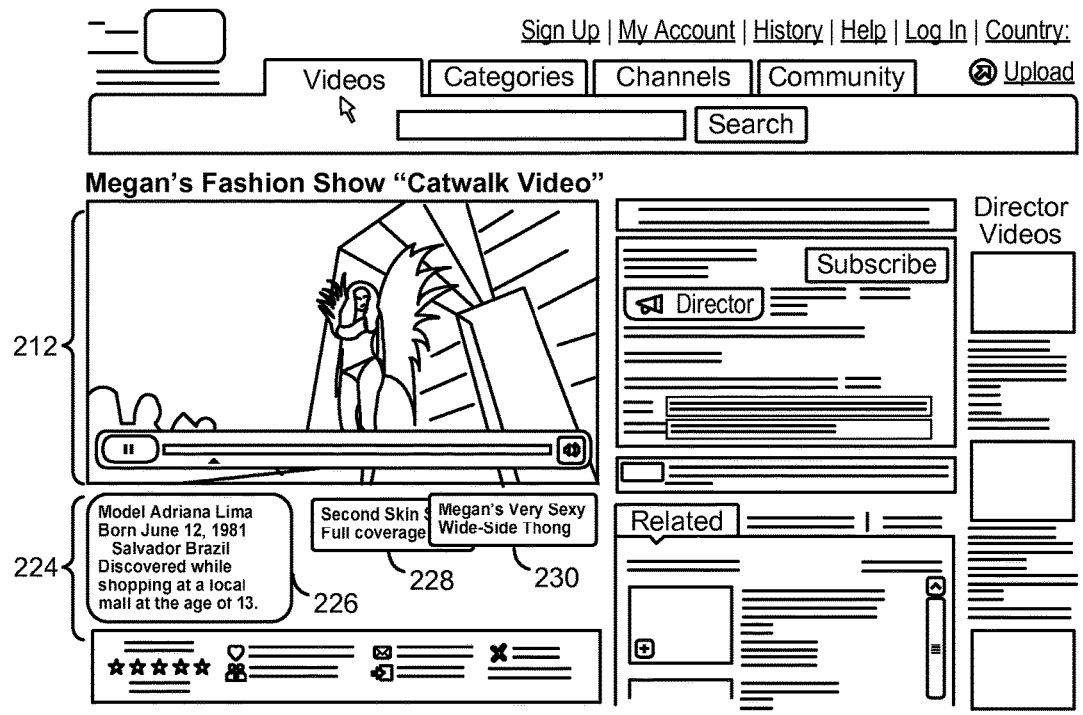
FIG. 11 shows a video after additional tag movement.
Figure 12:
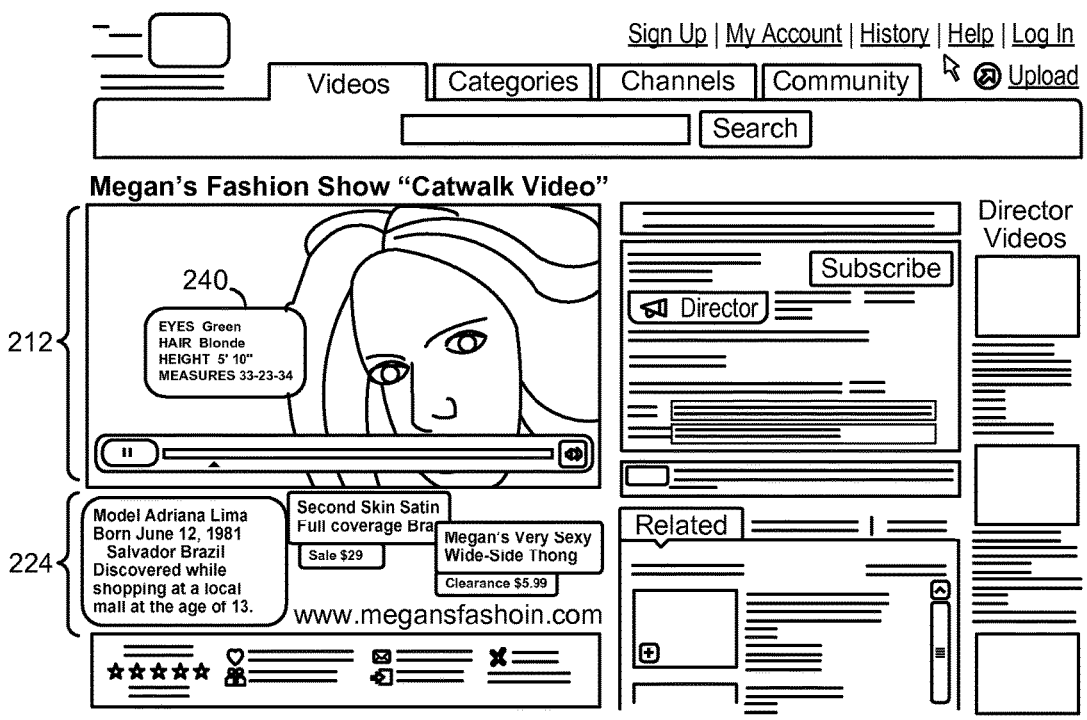
FIG. 12 shows tags reaching their final positions.

FIG. 11 shows tag 226 positioned at the left side of tag menu area 224 while tags 228 and 230 have moved to the tag menu area (and are still in motion moving sideways to create more separation between them). FIG. 12 illustrates a point in time where the tags have reached their final positions and additional information, such as price information and website address information is also displayed into the tag menu area. A new tag 240 has appeared to provide more information about the model. In this manner, any number and type of tag can be presented in association with an item in the video (or in the abstract) and can then be moved to the tag menu area. Each tag can be "clickable" so that, upon selection by a user, additional information related to the tag, such as a web page, is displayed. Other functionality may be provided to the tags—such as allowing a tag to expand to provide additional information, opening an adjacent window or frame next to the video playback to provide additional information or functionality, etc. Although specific content has been used in this example, it should be apparent that any other content can be used for the video and/or the tags.

Many other types of hardware and software platforms can be used to implement the functionality described herein. For example, a video player can be included in a portable device such as a laptop, PDA, cell phone, game console, e-mail device, etc. The tag data can reside on a storage device, server, or other device that is accessed over another network. In general, the functions described can be performed by any one or more devices, processes, subsystems, or components, at the same or different times, executing at one or more locations.

Accordingly, particular embodiments can provide for computer playback of video that supports automatically capturing of screen snapshots, in the accommodation of tag information outside of a video play area. Further, while particular examples have been described herein, other structures, arrangements, and/or approaches can be utilized in particular embodiments.

Any suitable programming language can be used to implement features of the present invention including, e.g., C, C++, Java, PUI, assembly language, etc. Different programming techniques can be employed such as procedural or object oriented. The routines can execute on a single processing device or multiple processors. The order of operations described herein can be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," "in a particular embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Further, distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The invention claimed is:

1. A method comprising:
    causing a display device to display a video depicting a first item and a second item in a video scene;
    causing the display device to display a first tag overlaid on the video, the first tag being associated with the first item depicted in the video, wherein the first tag includes descriptive text information describing the first item depicted in the video;
    causing the first tag to undergo continuous motion relative to at least a first portion of the video scene and causing the display device to display the video and the first tag overlaid on the video while the first tag overlaid on the video undergoes continuous motion with respect to said at least first portion of the video scene;
    causing the display device to display a second tag overlaid on the video, the second tag being associated with the second item depicted in the video, wherein the second tag includes descriptive text information describing the second item depicted in the video; and
    causing the second tag to undergo continuous motion relative to at least a second portion of the video scene and causing the display device to display the video and the second tag overlaid on the video while the second tag overlaid on the video undergoes continuous motion with respect to said at least second portion of the video scene.

2. The method of claim 1, further comprising:
    causing the display device to display, simultaneously with the first tag, a first visually perceptible indicator extending between a proximity where the first item is depicted in the video and a proximity of the first tag.

3. The method of claim 2, further comprising:
    adjusting the first visually perceptible indicator while the first tag overlaid on the video undergoes the continuous motion and causing the display device to additionally display the first visually perceptible indicator while the first tag overlaid on the video undergoes continuous motion.

4. The method of claim 1, further comprising:
    causing the display device to display, simultaneously with the second tag, a second visually perceptible indicator extending between a proximity where the second item is depicted in the video and a proximity of the second tag.

5. The method of claim 4, further comprising:
    adjusting the second visually perceptible indicator while the second tag overlaid on the video undergoes the continuous motion and causing the display device to additionally display the second visually perceptible indicator while the second tag overlaid on the video undergoes continuous motion.

6. The method of claim 1, further comprising:
    receiving from an input device a selection of a tag; and
    in response to receiving from the input device the selection of the tag, performing a predetermined action to provide additional information relating to the item in the video associated with the selected tag.

7. The method of claim 6, wherein the step of performing the predetermined action to provide the additional information relating to the item in the video comprises causing the display device to present a web page including the additional information relating to the item associated with the selected tag.

8. The method of claim 7, wherein the first tag and the second tag are each surrounded by a visually perceptible border defining a tag area and the step of performing the predetermined action to provide the additional information relating to the item depicted in the video comprises causing the display device to expand the tag area so that the additional information can be presented within the tag area along with the descriptive information describing the item associated with the selected tag.

9. The method of claim 6, wherein the step of performing the predetermined action to provide the additional information relating to the item associated with the selected tag comprises:

causing the display device to display a new window; and causing the display device to present, in the new window, the additional information relating to the item associated with the selected tag.

10. An apparatus for use with a video display device, the apparatus comprising:

a hardware processor; and a memory storing instructions that configure the hardware processor to:

cause the video display device to display a video depicting a first item and a second item in a video scene;

cause the video display device to display a first tag overlaid on the video, the first tag being associated with the first item depicted in the video, wherein the first tag includes descriptive text information describing the first item depicted in the video;

cause the first tag to undergo continuous motion relative to at least a first portion of the video scene and causing the video display device to display the video and the first tag overlaid on the video while the first tag overlaid on the video undergoes continuous motion with respect to said at least first portion of the video scene;

cause the video display device to display a second tag overlaid on the video, the second tag being associated with the second item depicted in the video, wherein the second tag includes descriptive text information describing the second item depicted in the video; and cause the second tag to undergo continuous motion relative to at least a second portion of the video scene and causing the video display device to display the video and the second tag overlaid on the video while the second tag overlaid on the video undergoes continuous motion with respect to said at least second portion of the video scene.

11. The apparatus of claim 10, wherein the memory further stores instructions that configure the hardware processor to cause the video display device to display, simultaneously with the first tag, a first visually perceptible indicator extending between a proximity where the first item is depicted in the video and a proximity of the first tag.

12. The apparatus of claim 11, wherein the memory further stores instructions that configure the hardware processor to adjust the first visually perceptible indicator while the first tag overlaid on the video undergoes the continuous motion and causing the video display device to additionally display the first visually perceptible indicator while the first tag overlaid on the video undergoes continuous motion.

13. The apparatus of claim 10, wherein the memory further stores instructions that configure the hardware processor to cause the video display device to display, simultaneously with the second tag, a second visually perceptible indicator extending between a proximity where the second item is depicted in the video and a proximity of the second tag.

14. The apparatus of claim 13, wherein the memory further stores instructions that configure the hardware processor to adjust the second visually perceptible indicator while the second tag overlaid on the video undergoes the continuous motion and causing the video display device to additionally display the second visually perceptible indicator while the second tag overlaid on the video undergoes continuous motion.

15. The apparatus of claim 10, wherein the memory further stores instructions that configure the hardware processor to:

receive from an input device a selection of a tag; and in response to receiving from the input device the selection of the tag, perform a predetermined action to provide additional information relating to the item in the video associated with the selected tag.

16. The apparatus of claim 15, wherein the predetermined action to provide the additional information relating to the item in the video comprises causing the video display device to present a web page including the additional information relating to the item associated with the selected tag.

17. The apparatus of claim 15, wherein the first tag and the second tag are each surrounded by a visually perceptible border defining a tag area, and wherein the predetermined action to provide the additional information relating to the item depicted in the video comprises causing the video display device to expand the tag area so that the additional information can be presented within the tag area along with the descriptive information describing the item associated with the selected tag.

18. The apparatus of claim 15, wherein the predetermined action to provide the additional information relating to the item associated with the selected tag comprises:

causing the video display device to display a new window; and causing the video display device to present, in the new window, the additional information relating to the item associated with the selected tag.

19. A computer-readable medium having instructions stored thereon, the instructions comprising:

instructions to cause a display device to display a video depicting a first item and a second item in a video scene;

instructions to cause the display device to display a first tag overlaid on the video, the first tag being associated with the first item depicted in the video, wherein the first tag includes descriptive text information describing the first item depicted in the video;

instructions to cause the first tag to undergo continuous motion relative to at least a first portion of the video scene and causing the display device to display the video and the first tag overlaid on the video while the first tag overlaid on the video undergoes continuous motion with respect to said at least first portion of the video scene;

instructions to cause the display device to display a second tag overlaid on the video, the second tag being associated with the second item depicted in the video, wherein the second tag includes descriptive text information describing the second item depicted in the video; and instructions to cause the second tag to undergo continuous motion relative to at least a second portion of the video scene and causing the display device to display the video and the second tag overlaid on the video while the second tag overlaid on the video undergoes continuous motion with respect to said at least second portion of the video scene.

20. The method of claim 19, wherein the first portion of the video scene and the second portion of the video scene are identical.

* * * * *